United States Patent
Lehmann et al.

(10) Patent No.: US 10,699,438 B2
(45) Date of Patent: Jun. 30, 2020

(54) MOBILE DEVICE LOCALIZATION IN COMPLEX, THREE-DIMENSIONAL SCENES

(71) Applicant: Siemens Healthcare GmbH, Erlangen (DE)

(72) Inventors: Oliver Lehmann, Princeton, NJ (US); Stefan Kluckner, Berlin (DE); Terrence Chen, Princeton, NJ (US)

(73) Assignee: Siemens Healthcare GmbH, Erlangen (DE)

(*) Notice: Subject to any disclaimer, the term of this patent is extended or adjusted under 35 U.S.C. 154(b) by 127 days.

(21) Appl. No.: 15/642,844

(22) Filed: Jul. 6, 2017

(65) Prior Publication Data

US 2019/0012806 A1 Jan. 10, 2019

(51) Int. Cl.
*G06K 9/00* (2006.01)
*G06T 7/73* (2017.01)
(Continued)

(52) U.S. Cl.
CPC ................ *G06T 7/75* (2017.01); *G06T 7/20* (2013.01); *G06T 7/246* (2017.01); *G06T 7/70* (2017.01); *G06T 7/73* (2017.01); *G06T 2207/10016* (2013.01); *G06T 2207/10028* (2013.01); *G06T 2207/20081* (2013.01); *G06T 2207/20084* (2013.01); *G06T 2207/20221* (2013.01); *G06T 2207/30241* (2013.01); *G06T 2207/30244* (2013.01)

(58) Field of Classification Search
CPC . G06T 7/75; G06T 7/246; G06T 2207/10028; G06T 2207/20081; G06T 2207/20221; G06T 2207/30241; G06T 2207/30244
See application file for complete search history.

(56) References Cited

U.S. PATENT DOCUMENTS 7,689,321 B2* 3/2010 Karlsson ............ G05D 1/0246
318/103
9,818,150 B2* 11/2017 Rhoads ............ G06Q 30/0643
(Continued)

FOREIGN PATENT DOCUMENTS

WO 2015017941 A1 2/2015

OTHER PUBLICATIONS

Knoop, Steffen, Stefan Vacek, and Rüdiger Dillmann. "Sensor Fusion for 3D Human body Tracking with an Articulated 3D Body Model." ICRA. 2006.*
(Continued)

*Primary Examiner* — Shefali D Goradia

(57) ABSTRACT

The present embodiments relate to localizing a mobile device in a complex, three-dimensional scene. By way of introduction, the present embodiments described below include apparatuses and methods for using multiple, independent pose estimations to increase the accuracy of a single, resulting pose estimation. The present embodiments increase the amount of input data by windowing a single depth image, using multiple depth images from the same sensor, and/or using multiple depth image from different sensors. The resulting pose estimation uses the input data with a multi-window model, a multi-shot model, a multi-sensor model, or a combination thereof to accurately estimate the pose of a mobile device.

16 Claims, 7 Drawing Sheets

(51) Int. Cl.
  *G06T 7/246* (2017.01)
  *G06T 7/20* (2017.01)
  *G06T 7/70* (2017.01)

(56) References Cited

U.S. PATENT DOCUMENTS

| | | | | |
|---|---|---|---|---|
| 2006/0221072 | A1* | 10/2006 | Se | G01C 11/06 345/420 |
| 2013/0156297 | A1* | 6/2013 | Shotton | G06K 9/6255 382/159 |
| 2013/0215116 | A1* | 8/2013 | Siddique | G06Q 30/0643 345/420 |
| 2014/0184749 | A1* | 7/2014 | Hilliges | G01S 17/89 348/47 |
| 2014/0206443 | A1* | 7/2014 | Sharp | A63F 13/00 463/31 |
| 2014/0212027 | A1* | 7/2014 | Hallquist | G06F 3/1415 382/154 |
| 2014/0260443 | A1 | 7/2014 | Sharp et al. | |
| 2014/0225985 | A1 | 8/2014 | Klusza et al. | |
| 2014/0253592 | A1* | 9/2014 | Cho | G06T 19/006 345/633 |
| 2015/0279083 | A1 | 10/2015 | Pradeep et al. | |
| 2015/0371440 | A1* | 12/2015 | Pirchheim | G06T 17/05 345/419 |
| 2017/0018086 | A1* | 1/2017 | Zhang | H04N 5/232 |
| 2017/0345183 | A1* | 11/2017 | Chen | G06T 7/74 |
| 2018/0144458 | A1* | 5/2018 | Xu | G06K 9/4676 |

OTHER PUBLICATIONS

Gelbart, Michael Adam. Constrained Bayesian Optimization and Applications. Diss. 2015.

Han, Song, Fluizi Mao, and William J. Daily. "Deep compression: Compressing deep neural network with pruning, trained quantization and Huffman coding." CoRR, abs/1510.00149 2 (2015).

Iandola, Forrest N., et al. "SqueezeNet: AlexNet-level accuracy with 50x fewer parameters and <1MB model size." arXiv preprint arXiv:1602.07360 (2016).

Kim, Yong-Deok, et al. "Compression of deep convolutional neural networks for fast and low power mobile applications." arXiv preprint arXiv:1511.06530 (2015).

Kerl, Christian, Jurgen Sturm, and Daniel Cremers. "Dense visual SLAM for RGB-D cameras." Intelligent Robots and Systems (IROS), 2013 IEEE/RSJ International Conference on. IEEE, 2013.

* cited by examiner

MOBILE DEVICE LOCALIZATION IN COMPLEX, THREE-DIMENSIONAL SCENES

BACKGROUND

Three-dimensional pose estimation, or localization in a three-dimensional scene, of a sensor has many useful applications, such in identifying a component or replacement part of an assembled product, or in augmented reality scenarios. Localization may be performed using global positioning systems (GPS) (e.g., mostly limited to outdoor use), or using beacon-based systems with sensors mounted in the three-dimensional scene (e.g., leading to installation and maintenance costs). GPS and beacon-based systems may not provide a viewing direction with the location, and suffer from positioning inaccuracies, typically making the resulting location information not accurate enough to be useful for many applications.

Localization may also be performed using simultaneous localization and mapping (SLAM). SLAM was developed for robotic mapping where a scene is mapped by the robot while keeping track of the location of the robot within the scene. SLAM is a time intensive process and is challenged by dynamic scenes (e.g., scenes containing humans or other non-static objects, and/or scenes with strong appearance changes due to dynamic elements, illumination, weather, or seasonal variability), which often render SLAM mapping algorithms inoperable. SLAM methods also balance location accuracy with computationally complexity, often sacrificing accuracy to allow the algorithms to run on mobile devices with low latency.

Other traditional pose estimation techniques are based on machine vision and are performed using measurements from a single-view (e.g., depth images recorded with a 2.5D sensing device), based on the principles of stereo vision, structured light sensors, or time-of-flight sensors. Recorded measurements are processed by machine vision solutions, such as using machine learning algorithms, to deduce a pose within the three-dimensional scene. Neural networks, such as convolutional neural networks (CNNs), may be used to handle many dimensions of data. Traditional pose estimation techniques are limited by the computationally expensive nature of processing depth data. To avoid prohibitive delays in a user-operated system, systems are restricted to processing single depth measurements.

SUMMARY

The present embodiments relate to localizing a mobile device in a complex, three-dimensional scene. By way of introduction, the present embodiments described below include apparatuses and methods for using multiple, independent pose estimations to increase the accuracy of a single, resulting pose estimation. The present embodiments increase the amount of input data by windowing a single depth image, using multiple depth images from the same sensor, and/or using multiple depth image from different sensors. The resulting pose estimation uses the input data with a multi-window model, a multi-shot model, a multi-sensor model, or a combination thereof to accurately estimate the pose of a mobile device. Efficient combination of multiple, independent pose estimation problems is provided, fusing the independent estimations into a single high-quality result.

In a first aspect, a method of estimating the pose of a mobile device in a three-dimensional scene is provided. The method includes receiving a plurality of depth data measurements by a processor of the mobile device. The depth data measurements are indicative of a depth from the mobile device to the three-dimensional scene. The method also includes estimating a first pose of the mobile device with respect to the three-dimensional scene based on a first depth measurement of the plurality of depth data measurements and estimating a second pose of the mobile device with respect to the three-dimensional scene based on a second depth measurement of the plurality of depth data measurements. The method further includes estimating a third pose of the mobile device with respect to the three-dimensional scene with a pose model based the first pose and the second pose and providing an output to a user based on the third pose.

In a second aspect, a system for determining the pose of a mobile device in a three-dimensional scene is provided. The system includes a memory for storing a plurality of depth data measurements indicative of a depth from the mobile device to the three-dimensional scene. The system also includes a processor that receives the plurality of depth data measurements and determines a pose of the mobile device with respect to the three-dimensional scene. The pose is determined based on fusing estimated poses for each of the plurality of depth data measurements with a dynamic model, and the pose includes a location and viewing angle of the mobile device.

In a third aspect, another method of localizing a mobile device in a three-dimensional scene is provided. The method includes capturing a plurality of depth image data sets of the three-dimensional scene by a sensor of the mobile device and generating a plurality of initial pose estimations of the mobile device with respect to the three-dimensional scene by a processor of the mobile device. Each of the initial pose estimations based on a different depth image data set. The method also includes generating a fused pose estimation of the mobile device with respect to the three-dimensional scene by the processor of the mobile device using a trained machine-learning model based on the initial pose estimations, and displaying an output based on the fused pose estimation by a display of the mobile device.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

Figure 1A:
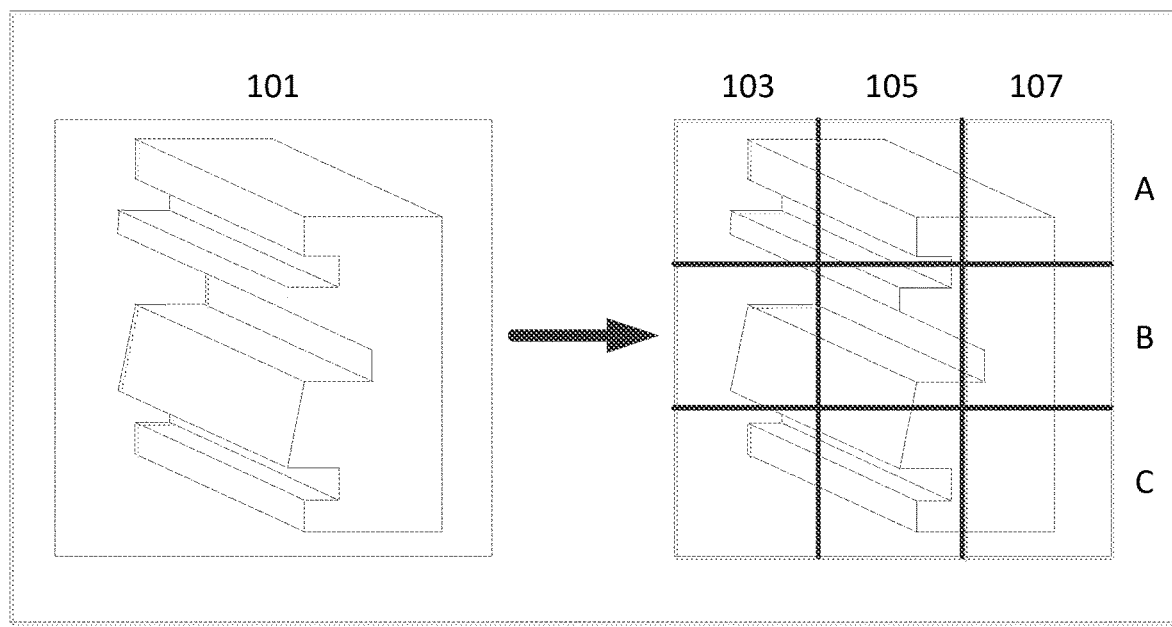
FIGS. 1A-1B illustrate an example of windowing a sensor measurement for multi-window fusion.

The present embodiments provide methods and systems to robustly localize mobile devices or other sensors in scenes with complex, three-dimensional geometries. The present embodiments leverage fusion of multiple measurements and location information using a dynamic model to accurately estimate the location and viewing direction (e.g., a pose) of the mobile device. The estimated pose may be used in a variety of business fields (e.g., industrial, automotive, healthcare, entertainment, maintenance, etc.) and may allow for new features and services to be provided based on location awareness of the mobile device (e.g., scene-based decision making, product identification, augmented reality, etc.).

Previous solutions for localizing a mobile device relative to a scene viewed by the mobile device have been limited by the computational complexity and expense of processing depth data (e.g., 2.5D or 3D camera data). For example, to prevent prohibitive delays in a user-operated system, localization by and of mobile devices has been restricted to processing a single depth measurement. With increased computational power of mobile devices (e.g., smartphones, tablets, laptop computers, etc.) and improved performance of neural network-based solutions, the present embodiments provide for localizing the mobile device using multiple depth measurements and/or by fusing multiple pose estimations to accurately localize the mobile device. As such, the present embodiments provide for improved pose estimation in complex, three-dimensional scenes with negligible processing latency.

For example, mobile device localization may be used to estimate a pose of the mobile device for automatically identifying a part number of an assembled product in view of the mobile device. In an example, a user seeks to identify a replacement part number for component of a high speed train. Because high speed trains are complex and have many similarities between models and components, a user may capture depth images of the component to be replaced for automatically identifying a part number associated with the replacement component. To identify the component, the mobile device estimates a pose of itself with respect to the high speed train (i.e., a complex, three-dimensional scene), and leverages that information to identify the replacement component. The present embodiments may be used on any assembled product or three-dimensional scene, and are not limited to the aforementioned high speed train example.

The present embodiments are provided for estimating the pose of the mobile device using multiple measurements (e.g., multiple measurements captured or generated by a mobile device with scene-sensing capabilities). The measurements may be one or more depth images, one or more color images (RGB), and/or a combination of depth and color images of the observed scene (e.g., the component of the high speed train). The pose estimation problem is measurement-driven and provides an output D(t) at a time t. The relative three-dimensional device location $\bar{x}(t)$, relative three-dimensional device orientation $\bar{d}(t)$, or a combination are provided in the output. A pose of the mobile device $\hat{p}(t)$ may be calculated, relative to the surrounding scene, as:

$$\hat{p}(t) = (\bar{x}(t), \bar{d}(t)) \quad (1)$$

A solution to this pose estimation problem is provided by solving a function finding $\hat{p}(t)$ from multiple measurements $D(\tau)$, where $\tau \leq t$. By estimating the pose $\hat{p}(t)$ of the mobile device from multiple measurements, an output based on the pose estimation may be provided (e.g., used to provide a correct replacement part number to the user).

The function finding $\hat{p}(t)$ from multiple measurements $D(\tau)$, where $\tau \leq t$. includes combining multiple, independent pose estimation problems for each of the device measurements and generating a single, high-quality resulting pose of the mobile device. For example, multiple pose estimations $\hat{p}(\tau)$, where $\tau \leq t$, are fused to generate the resulting pose $\hat{p}(t)$. The present embodiments provide methodologies for fusing the input pose estimations $\hat{p}(\tau)$ to generate the resulting pose estimation $\hat{p}(t)$. The methodologies include: multi-window fusion; multi-shot fusion; and multi-sensor fusion. The methodologies may be used independently to generate the resulting pose estimation $\hat{p}(t)$, or combined to provide a more robust pose estimation.

Figure 1B:
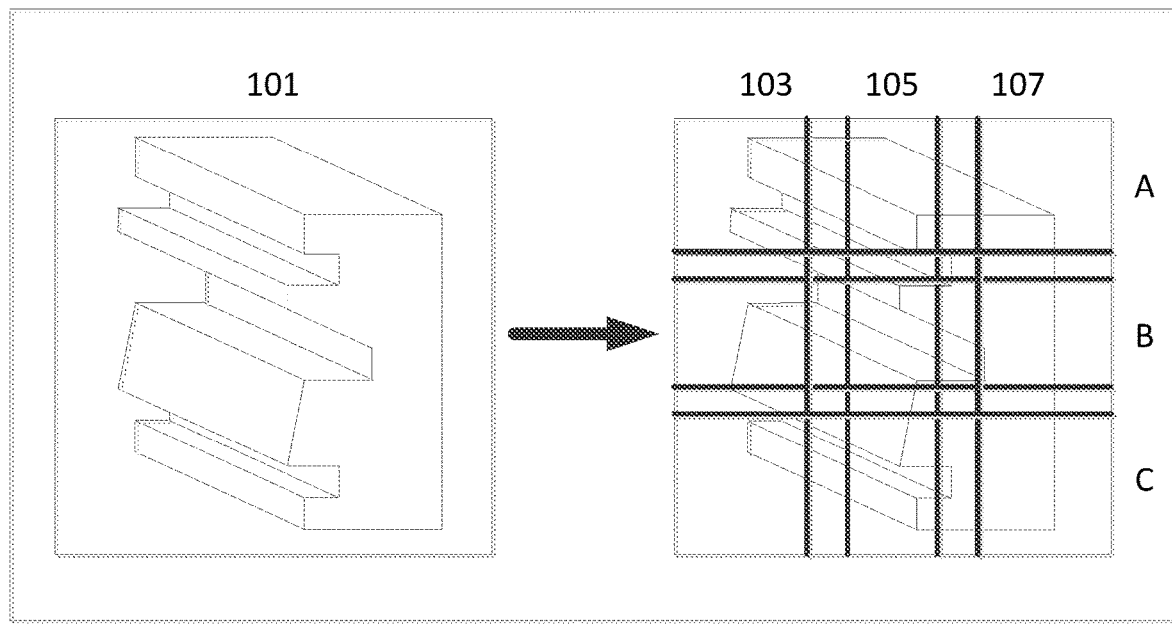

In one or more embodiments, multi-window fusion is used. Multi-window fusion is based on a single-view measurement that is partitioned into multiple, smaller measurements by windowing. For example, FIGS. 1A-1B illustrate an example of windowing a sensor measurement for multi-window fusion. The input measurement 101 is a depth image of a three-dimensional scene. Referring to the example above, the three-dimensional scene includes the object of interest (i.e., a component or portion of the high speed train) and background information. The background information is noise, making the pose estimation more difficult. The input measurement 101 is partitioned, or windowed, using a using a two-dimensional rectangular tapering function to generate a plurality of input measurements. In the example illustrated in FIGS. 1A-1B, the input measurement 101 is partitioned into nine (9) measurements 103A-103C, 105A-105C and 107A-107C. Additional or fewer windows may be used. The partitioned windows are used to generate a plurality of pose estimations. In FIG. 1A, the windows do not overlap. In FIG. 1B, overlapping windows are provided. Overlapping windows may increase robustness which may be lost due to effects of "cutting" crucial information into two or more views (sub-windows), potentially preventing accurate pose estimation. Some of the windowed measurements include the background as an input (e.g., 103A-103C, 105A, 105C and 107A-107C). A pose estimation based on input 105B does not include the background noise. Other input measurements 101 may or may not include a background. A plurality of pose estimations based on the partitioned windows are used with multi-window fusion to generate an accurate pose of the mobile device. A benefit of multi-window fusion as a robustness-based method is suppressing lower-quality estimates that are tainted by background noise.

In another example, a VGA-resolution sensor is used to provide a depth map of 640-by-480 pixels. Other resolutions may be used. The depth map is subdivided into $M_w$-by-$N_h$ (width×height) pixel sub-windows by a sliding rectangular window over the depth map. To mitigate potential information loss at the edges of the windowing, the individual sub-partitions may overlap in the pixel space. Adjacent windowing may also be used. A pose is estimated for each of the N sub-windows. The N pose estimations are combined to generate a resulting pose estimation for the depth map. The pose estimations may be combined using robust statistics methods as for example weighted average methods, mode finding methods, or higher-level semantic mapping methods (e.g., with one or more convolutional neural networks). Other methods of combining the poses may also be used.

Multi-window fusion may increase processing time and the associated energy consumption of the mobile device, as pose estimation is repeated N times (i.e., repeated once for each window). A stack-processing of GPUs may be used harnessing their parallel computation capabilities, limiting the additional processing time for computing the pose estimations in a single pass. To further increase processing speed, multiple approaches simplifying the convolutional neural networks (CNNs) in semantic mapping methods may be used during feature mapping, while retaining suitable accuracy levels. For example, a squeeze net-approach offers the benefit of a smaller CNN architecture, reducing the number of calculations during feature extraction. Another approach applies CNN compression algorithms that reduce the computational complexity of the feature extraction through pruning and trained quantization. Other methods of simplifying a CNN and their computations may be used.

Figure 2:
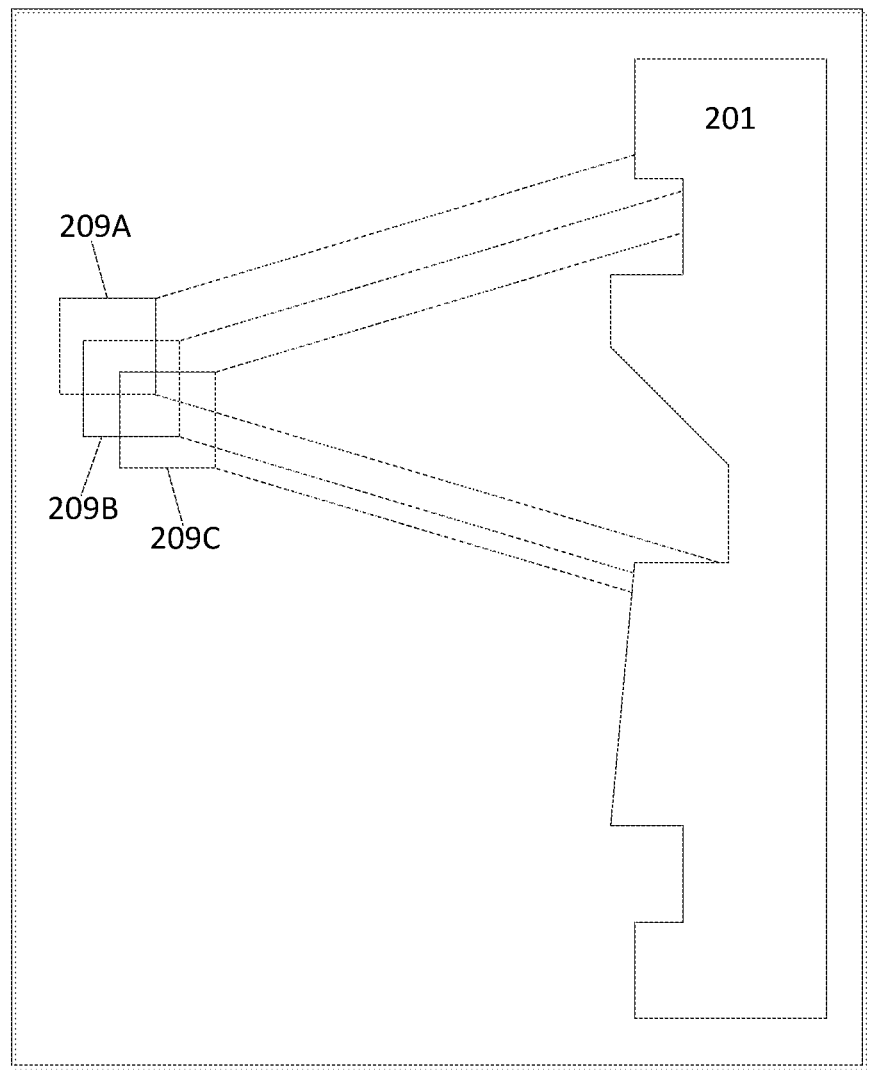
FIG. 2 illustrates an example of capturing multiple measurements for multi-shot fusion using a motion model.

In one or more embodiments, multi-shot fusion is used. Multi-shot fusion is based on using multiple measurements by the same sensor (i.e., mobile device) to provide more data to estimate a resulting pose of the mobile device. A sequence of M consecutive or non-consecutive sensor measurements $D(\tau)$, wherein $\tau \leq t$, are acquired by the sensor of a mobile device. The sequence of measurements M are used to generate multiple pose estimations that are combined to generate the resulting pose of the mobile device. For example, FIG. 2 illustrates an example of capturing multiple sensor measurements for multi-shot fusion using a motion model. In this example, the multiple measurements 209A, 209B, 209C are captured with the sensor of a mobile device as the mobile device moves. The mobile device may be moved purposefully by the user, or the motion may be unintentional movement of the mobile device by the user. Because the mobile device is in motion, each of the measurements 209A, 209B, 209C will be different, resulting in additional data available for pose estimation. In an example, the measurements are consecutive measurements extracted from a video captured by the mobile device.

In an embodiment, a pose is estimated for each of a plurality of measurements M by the sensor of a mobile device. A pose $D(\tau)$ is estimated for each of the measurements M and the sequence of results $(\tau, \hat{p}(\tau))$ are used in a prediction-correction framework to refine the estimation. The prediction-correction framework relies on a motion model used to estimate the resulting pose estimation $\hat{p}(t)$. In particular, a motion model is provided for modeling the perturbations of a pose around a possibly unknown initial pose $\hat{p}(t_0)$, such as:

$$\hat{p}(t)=\hat{p}(t_0)+\int \hat{v} dt \qquad (2)$$

The above referenced motion model is a linear motion model based on time and velocity of the mobile device as the measurements are taken. For example, the motion model is established using inertial measurement unit (IMU) data that is processed to predict a current relative position based on IMU-measured velocity and time. An IMU is a hardware system of the mobile device with motion sensors (e.g., typically including three accelerometers, three gyroscopes, and, optionally, three magnetometers that provide at least three-dimensional inertial acceleration and relative rotational positioning of the mobile device).

The IMU data is used by a processing system of the mobile device for calculating the relative orientation of the mobile device in space. The sequence of pose estimations $(\tau, \hat{p}(\tau))$ is then used to correct the position prediction of the motion model based on IMU data, yielding the eventual estimated pose of the device at a time t, or yielding poses at all sensing times T. Possible prediction-correction frameworks may be based on Kalman-like filters that filter the pose estimations through the motion model to get a better resulting pose estimation (e.g., traditional Kalman filters, unscented Kalman filters, particle filters, etc.). Other prediction-correction frameworks may be used.

In another embodiment, a pose is estimated using a learned motion model. For example, as opposed to using a linear motion model with uncertainties as discussed above, reasonable motion trajectories of the mobile device are learned, and unreasonable or unrealistic motion trajectories are filtered and removed. Knowledge of the three-dimensional scene may be used to filter unreasonable or unrealistic trajectories of the mobile device, such as trajectories of the mobile device moving into an object, moving too close or too far from an object, or moving from one side of an object to directly the other side of the object.

For example, recognizing that pose p(t) and measurement $D(\tau)$ at time t are connected to other information (e.g., sensor data, pose estimations, IMU data, etc.) for a short-term horizon of a length T before time t, the connected information may be used to better estimate the pose $\hat{p}(t)$. As such, the pose estimation problem may be solved as an optimization problem, such as:

$$\hat{p}(t)=\arg\min_p g(\{(\tau,D(\tau),p'(t)):t-\tau \leq T\}) \qquad (3)$$

A variant of a multi-layer perceptron (MLP) architecture with memory is used to learn the optimization function g. The memory of the MLP architecture uses the learned motion trajectories overtime. Typically, MLP architectures assume that all inputs and outputs are mutually independent. For an MLP architecture to be applicable to modeling a time series (e.g., sequences $\{(D(\tau),\hat{p}(t)):t-\tau \leq T\}$), temporal information is included in the input data. For example, recurrent neural networks (RNNs) may be used. RNNs are MLP architectures that are specifically designed to solve this type of optimization problem by adding memory to the network by using recurrent connections between layers that create an internal state, allowing RNNs to learn the temporal dynamics of sequential data. The learned motion model is used to accurately estimate a resulting pose of the mobile device based on the realistic trajectories of the mobile device. Alternatively, long short-term memory (LSTM) networks maybe used.

In yet another example for multi-shot fusion, model driven movement of the sensor of the mobile device is used to generate additional measurements. In some situations, additional, similar measurements by the sensor of the mobile device does not add any additional useful information for generating the resulting pose estimation. As such, the model may suggest that the mobile device move to a new location to capture additional useful information. For example, one or more of the motion trajectory schemes (e.g., motion models) may be extended to a sequence of viewpoint-planning steps for capturing sensor measurements. The trajectory schemes may minimize the number of user interactions necessary to achieve a predetermined estimation quality by only capturing a small number measurements.

Figure 3:
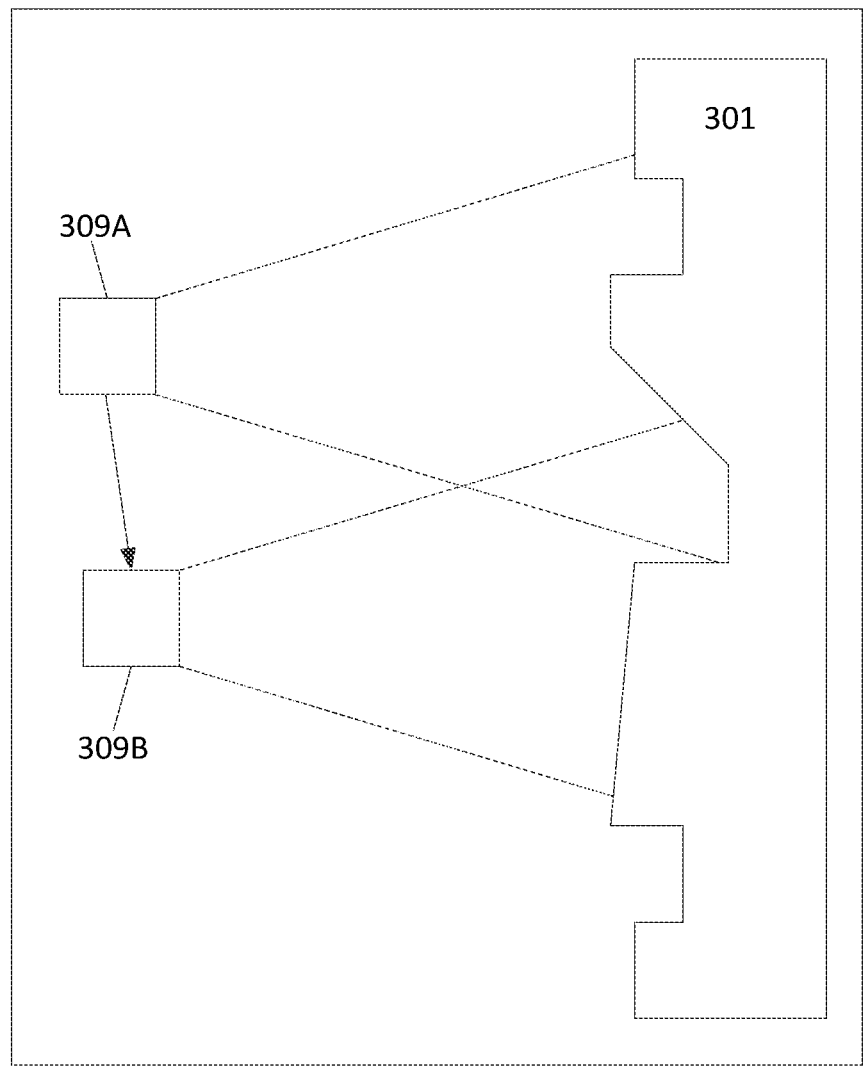
FIG. 3 illustrates an example of capturing multiple measurements for multi-shot fusion using a suggested measurement location.

For example, FIG. 3 illustrates an example of capturing multiple sensor measurements for multi-shot fusion using suggested measurement locations. A first measurement 309A is captured by a mobile device. The first measurement 301A is then used to derive an initial pose estimation, and the algorithm suggests a new measurement location to capture another measurement. The user then physically moves the device to the suggested location and collects a second measurement 309B. The second measurement data 309B is fused with the initial measurement data 309A to derive a second pose estimation. The algorithm runs this viewpoint-planning method iteratively until the resulting pose estimation quality is sufficient. The resulting pose may be a pose of the mobile device at the first location, and each additional estimation increases the quality of all pose estimations.

In this embodiment, the model used for the motion trajectory schemes is based on Bayesian statistics and optimal learning (e.g., Bayesian global optimization). An iterative algorithm is used to model the measurement data (D(t),p̂(t)) of the viewpoint-planning sequence as a Gaussian process (GP). Using gathered sensor measurements D(t) and corresponding pose estimations p̂(t) based on the measurements, a model is selected explaining the data through optimized hyperparameters of the GP. Using the model, a new measurement location is proposed as the mobile device location maximizing the expected improvement of the pose estimation (e.g., the point that minimizes the uncertainty of the model selected). At the new measurement location, an additional measurement is captured to enrich the knowledge of the underlying GP at the next iteration of pose estimation. Any number of iterations may be used to increase the accuracy of the resulting pose estimation.

In one or more embodiments, multi-sensor fusion is used. For example, as depth sensors are becoming smaller and cheaper, multiple sensors may be combined in a single mobile device to provide simultaneous sensor measurements. Using several sensors in a single device may exploit the advantages of combining different types of sensors with different physical principles to measure depth more accurately. For example, a time of flight sensor and a structured light sensor may be combined to increase the measurement response on poorly textured objects (e.g., glass surfaces). Other combinations of sensors may be used, such as stereographic sensing with both sensors being of a same type.

Figure 4:
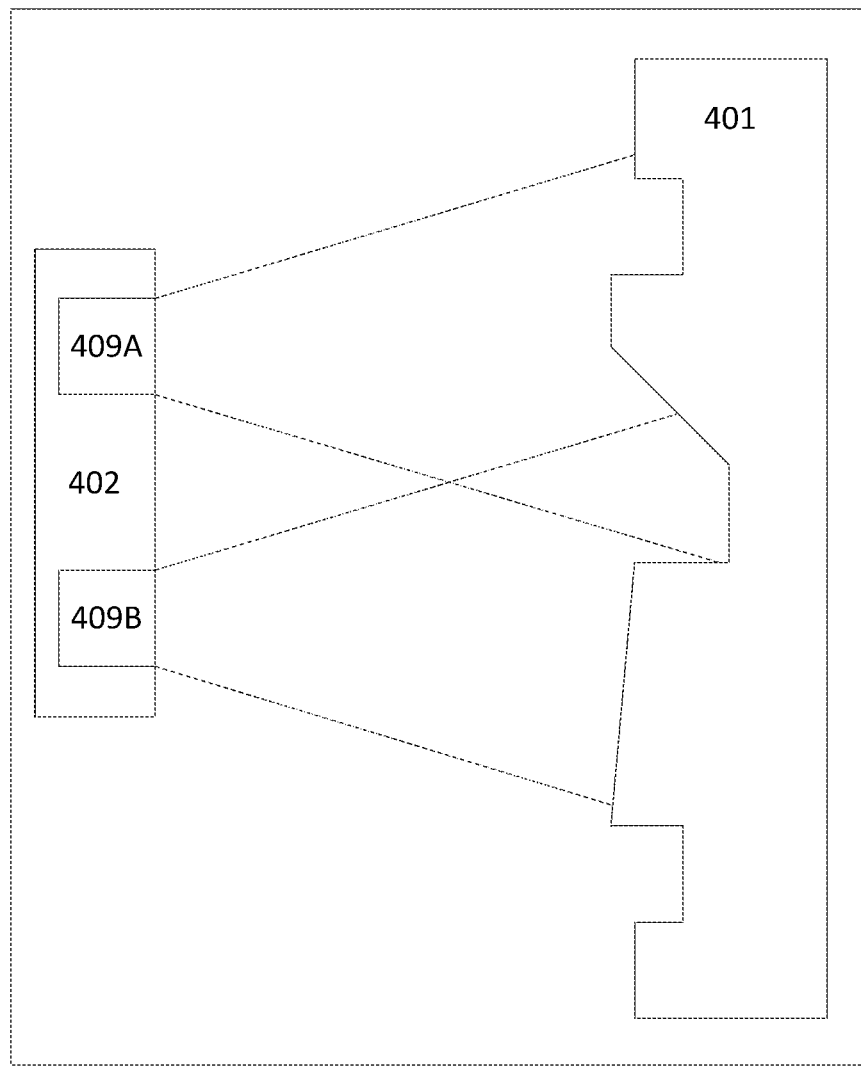
FIG. 4 illustrates an example of capturing measurements for multiple sensors in multi-sensor fusion.

FIG. 4 illustrates an example of capturing multiple sensor measurements for multi-sensor fusion. Mobile device 402 is provided with two sensors 409A, 409B for simultaneously capturing two sensor measurements. The sensor measurements from the two sensors 409A, 409B are used to generate independent pose estimations (e.g., generated in parallel operations). Methodologies discussed above may be used to fuse the independent pose estimations into a resulting pose estimation (e.g., multi-shot fusion, etc.). Alternatively or additionally, the spatial relationship between the two sensors 409A, 409B is known, therefore the pose estimations are expressed with a single frame of reference (e.g., using a priori known calibration data). Assuming that all sensors are mounted (e.g., fixed) on the device, then bijective mapping is provided between a pixel measurement in one sensor and an equivalent (e.g., if such exists and is visible) in all other sensors, as used in stereo vision applications.

Each of the aforementioned methodologies (e.g., multi-window, multi-shot and multi-sensor fusion) may be used independently or combined to generate the resulting pose estimation p̂(t). As such, accuracy of the resulting pose estimation of a mobile device may be improved. For example, in applications where the mobile device assists with close human-machine interactions (e.g., intelligent assist devices), increased accuracy of the pose estimation may increase operator and human safety.

Additionally, the present embodiments may be used in applications relying on scene understanding for decision making. As such, the present embodiments may increase the accuracy of tasks such as automated part identification in assembled products and initialization and tracking in an augmented reality (AR) scenarios. As discussed above, the pose of a mobile device with respect to a product may be used to accurately identify a component or replacement part number for a product (e.g., a replacement part for a high speed train). In another example, typically AR applications perform an initialization phase where a mobile device (e.g., equipped with a camera) is aligned in six degrees of freedom (e.g., location and viewing direction) with respect to a stored model of the AR scenario, often relying on pre-computed, static models and a single camera observation (e.g., depth measurement) to estimate the pose of the mobile device, leading to substandard product performances due to location inaccuracies or complete failures in ambitious scenarios (e.g., where observed reality deviates from the underlying model). By using the present embodiments, AR initialization and tracking may be performed with greater accuracy using multi-window fusion, multi-shot fusion, and/or multi-sensor fusion to more accurately estimate the initial pose of the mobile device and to track the mobile device during the AR scenario. Other applications of the present embodiments may be provided.

Figure 5:
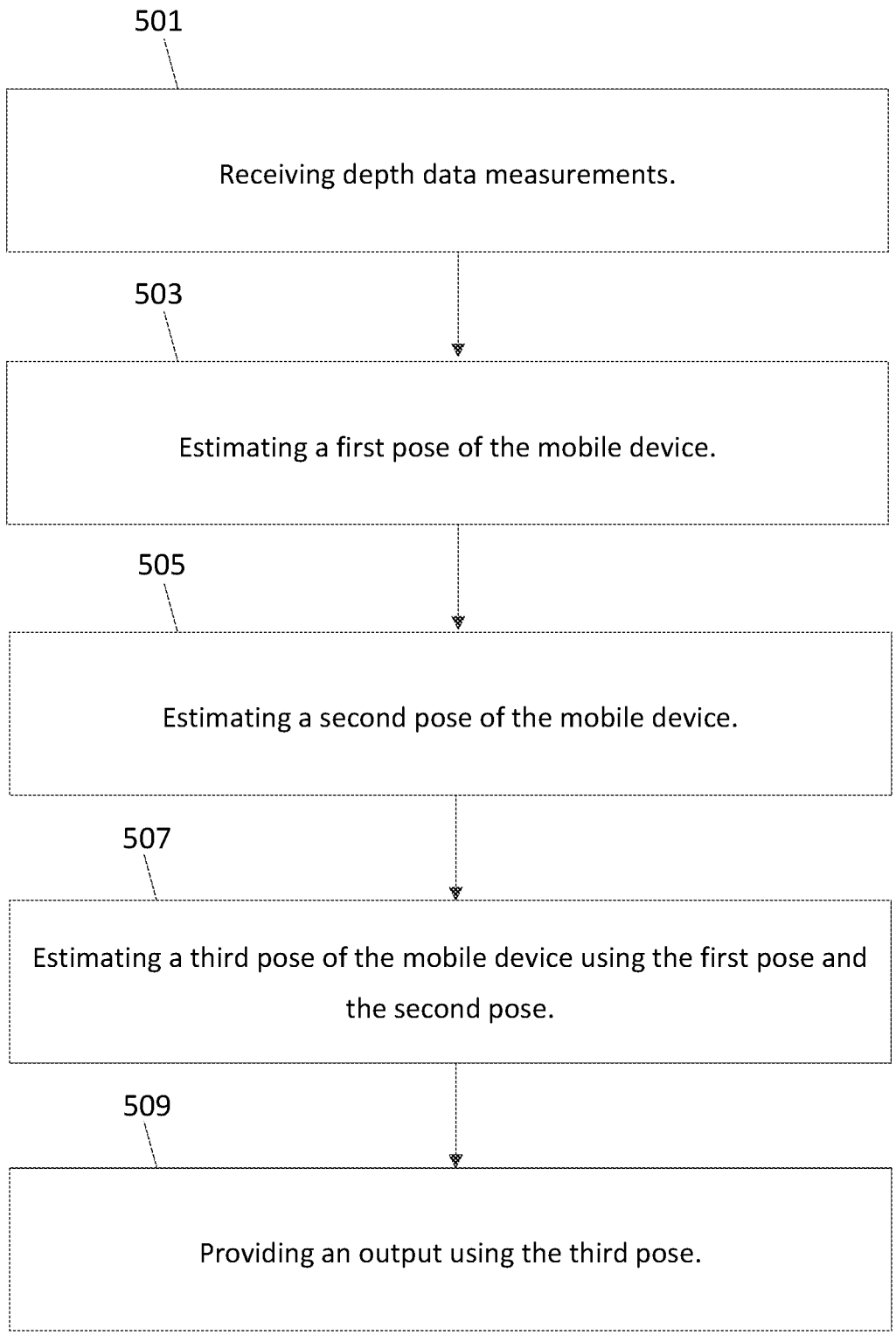
FIG. 5 illustrates a flowchart diagram of an embodiment of estimating the pose of a mobile device in a three-dimensional scene.

FIG. 5 is a flowchart diagram of an embodiment of estimating the pose of a mobile device in a three-dimensional scene. The method is implemented by the system of FIG. 6 (discussed below) and/or a different system. Additional, different or fewer acts may be provided. For example, the act 509 may be omitted. The method is provided in the order shown. Other orders may be provided and/or acts may be repeated. For example, acts 501, 503 and 505 may be repeated for receiving additional depth measurements and estimating additional poses. Further, acts 503 and 505 may be performed concurrently as parallel acts.

At act 501, a plurality of depth data measurements are received. For example, the depth measurements are received by a processor of a mobile device, and the depth data measurements are indicative of a depth from the mobile device to a three-dimensional scene. In an example where a user needs to identify a replacement part number for component of a high speed train, one or more depth images are captured of the train by a camera or cameras of the mobile device, and the depth images are provided to and received by the processor of the mobile device for pose estimation. The depth measurements may be captured for the purposes of multi-window fusion, multi-shot fusion, multi-sensor fusion, or a combination thereof.

In an embodiment, the depth measurements are for multi-window fusion. In this embodiment, a single depth image captured by a sensor of the mobile device and the depth image is partitioned into a plurality of depth measurements. Referring back to FIGS. 1A-1B, a depth image 101 is partitioned into a plurality of smaller depth images 103A-103C, 105A-105C, 107A-107C. The windows may or may not overlap. If additional depth images are partitioned, depth images with background and other noise may be filtered out (e.g., windows at the periphery of the scene). The partitioning may be performed by the processor of the mobile device, or are partitioned prior to the processor receiving the plurality of depth measurements.

In another embodiment, the depth measurements are for multi-shot fusion. In this embodiment, the plurality of depth data measurements are captured by the same sensor. Referring back to FIG. 2, depth measurements 209A, 209B, 209C are captured as the mobile device is in motion. Alternatively, the depth measurements 209A, 209B, 209C may be derived from a video captured by the mobile device (e.g., with the sensor panning the object 201). In another alternative, referring back to FIG. 3, the mobile device may be moved to different locations for capturing the depth measurement. The mobile device captures depth measurement 309A, then is moved to a different location to capture depth measurement 309B. For example, the mobile device may instruct the user to move the mobile device to the different location (e.g., audibly with an audible instruction, visually via a display to the user, etc.).

In yet another embodiment, the depth measurements are for multi-sensor fusion. In this embodiment, the different depth data measurements are captured by different sensors. Referring back to FIG. 4, mobile device 402 has two sensors 409A, 409B. Additional sensors may be used. Using the two sensors, two depth measurements are captured simultaneously. The two sensors may be the same, similar or different types of sensors.

In a further embodiment, the depth measurements are for a combination of multi-window fusion, multi-shot fusion, and/or multi-sensor fusion. For example, each of a plurality of depth measurements captured by the same or by multiple sensors are each partitioned for combining multi-window fusion with multi-shot fusion and/or multi-sensor fusion. As another example, multiple different sensors may each capture a plurality of depth measurements for combining multi-shot fusion with multi-sensor fusion.

At act 503, a first pose of the mobile device with respect to the three-dimensional scene is estimated. The first pose is estimated by the processor of the mobile device based on a first depth measurement of the plurality of depth data measurements. In this embodiment, regardless of whether multi-window fusion, multi-shot fusion, multi-sensor fusion, or a combination thereof are being used, the first pose estimation is based on a single depth measurement. At act 505, a second pose of the mobile device with respect to the three-dimensional scene is estimated. The second pose is estimated by the processor of the mobile device based on a second depth measurement of the plurality of depth data measurements. In this embodiment, like in act 503, the second pose estimation is based on another single, different depth measurement.

At act 507, a third pose of the mobile device with respect to the three-dimensional scene is estimated. Using a pose model, the third pose is estimated by the processor of the mobile device based the first pose and the second pose. Additional poses may be used to generate the third pose. The third pose may be generated using multi-window fusion, multi-shot fusion, multi-sensor fusion, or a combination thereof. The poses are related to each other by a motion model which may be explicitly expressed (e.g., a Kalman model) or provided by a convolutional neural network (CNN) based approach (recurrent neural network (RNN) or long short-term memory (LSTM)).

In an embodiment, multi-window fusion is used to generate the third pose estimation. As discussed above, the plurality of depth data measurements are partitioned from a single sensor measurement. Each of the estimated poses of acts 503 and 505 are for the same pose of the mobile device. Using pose estimations from the plurality of depth measurement, a resulting pose estimation is generated. For example, the first pose and the second pose, and optionally additional poses, are combined into the third pose using a weighted average, mode finding, or semantic mapping.

In another embodiment, multi-shot fusion is used to generate the third pose estimation. As discussed above, the plurality of depth data measurements are captured by the same sensor at different locations or poses. A motion model, based on movement of the sensor between measurements, is used to generate the third pose estimation. In an example, the motion model is a linear motion model based on sensor velocity measurements and corresponding time measurements. In another example, the motion model is a learned motion model. The learned motion model determines possible trajectories of the sensor based on the plurality of depth data measurements as well as the first pose and the second pose. In yet another example, the motion model specifies a location of the mobile device for the second depth measurement based on the first pose of the mobile device, and subsequently generates the third pose based on the first pose and a second poses based on the second depth measurement.

In yet another embodiment, multi-sensor fusion is used to generate the third pose estimation. As discussed above, the plurality of depth data measurements are captured by different sensors. The pose model for multi-sensor fusion is a spatial model based on known spatial relationships between the different sensors. For example, the first pose is estimated by the first sensor measurement captured by a first sensor and the second pose is estimated by the second sensor measurement captured by a second sensor. The first and second poses are combined into the third pose using the model based on the spatial relationship between the first and second sensors.

In a further embodiment, a third pose is generated using a combination of multi-window fusion, multi-shot fusion and/or multi-sensor fusion. For example, the plurality of depth data measurements include a plurality of measurements captured by two or more different sensors, and are optionally partitioned to generate additional depth data measurements. The pose model includes a motion model based on movement of each sensor between measurements by the sensor and a spatial model based on known spatial relationships between the different sensors. Other combinations of pose models may be used.

At act 509, an output is provided. For example, the output is provided to the user or consumer via a display on the mobile device. In one embodiment, automated part identification is performed to provide the user with a part number of a component of an assembled product. In this embodiment, the three-dimensional scene comprises a three-dimensional apparatus (e.g., a high speed train), and the output to the user is information about a component of the three-dimensional apparatus (e.g., a part number for the high speed train). In another embodiment, the output to the user is an initialization or tracking of the mobile device in an augmented reality scenario. For example, the output is a modified view of the three-dimensional scene displayed to the user. The pose is used to map an overlay or computer generated information onto a specific location in a scene viewed by the mobile device. In yet another example, the output may be provided to another system or algorithm. Other outputs may be provided.

Figure 6:
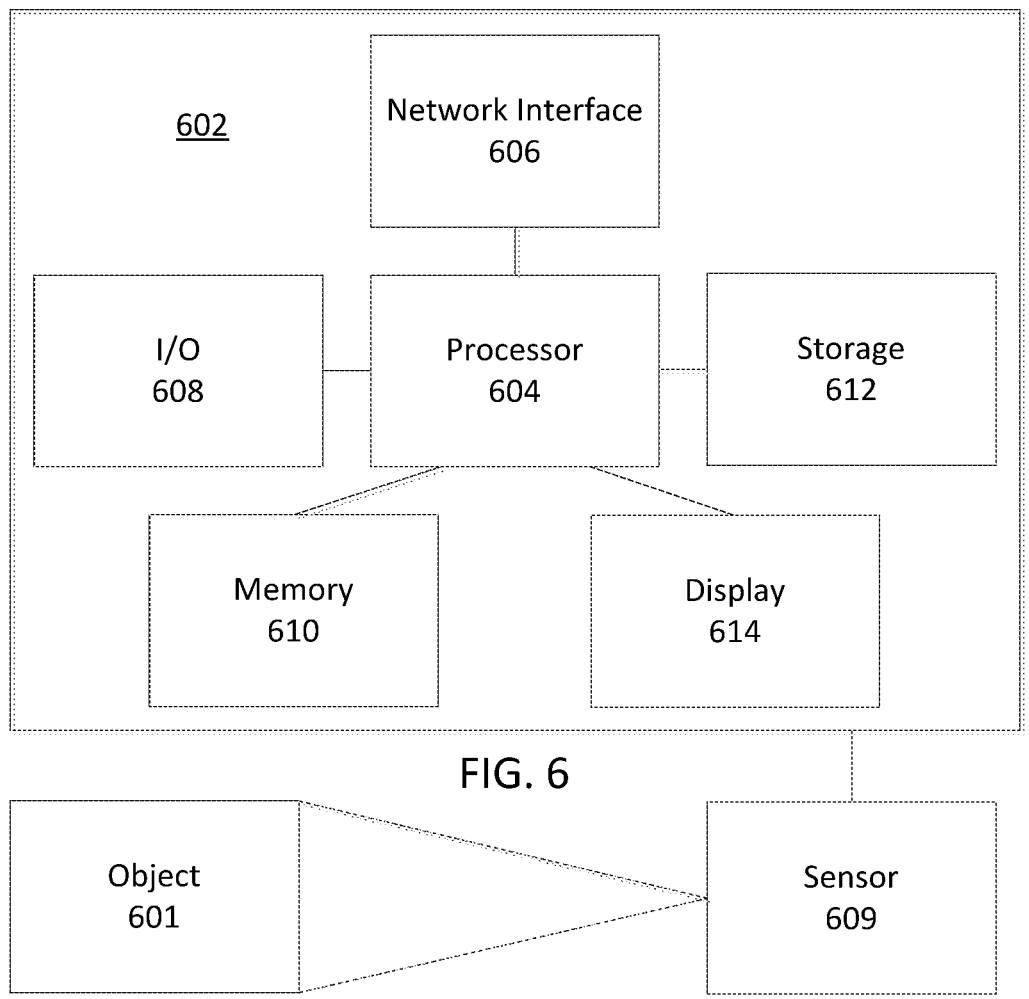
FIG. 6 illustrates an embodiment of a system for determining the pose of a mobile device in a three-dimensional scene.

FIG. 6 illustrates an embodiment of a system for determining the pose of a mobile device in a three-dimensional scene. For example, the system is implemented on a mobile device 602. The mobile device 602 is a smart phone, tablet, or other handheld or carriable computerized system with one or more depth cameras and other scene-recording sensors (e.g., for capturing inertial measurement unit (IMU) data).

A high-level block diagram of such a mobile device 602 is illustrated in FIG. 6. Mobile device 602 includes a processor 604, which controls the overall operation of the mobile device 602 by executing mobile device program instructions which define such operation. The mobile device program instructions may be stored in a storage device 612 (e.g., magnetic or solid state disk) and loaded into memory 610 when execution of the mobile device program instructions is desired. The memory 610 may be local memory as a component of the mobile device 602, or remote memory accessible over a network, such as a component of a server computer and/or cloud system. Thus, the acts of the methods illustrated in FIG. 5 and FIG. 7 (discussed below) may be defined by the mobile device program instructions stored in the memory 610 and/or storage 612, and controlled by the processor 604 executing the mobile device program instructions.

A sensor 609, such as a three-dimensional scanner or depth camera, is provided as part of the mobile device 602 to input image data to the mobile device 602. It is also possible to implement the sensor 609 and the mobile device 602 separately, with the sensor 609 connected to the mobile device 602. It is further possible that the sensor 609 and the mobile device 602 communicate wirelessly through a network.

The mobile device 602 includes a sensor 609 for capturing depth measurements. Sensor 609 is any three-dimensional sensor, 2.5D sensor, three-dimensional scanner or a three-dimensional camera. The mobile device 602 may include two or more sensors (e.g., for capturing depth images, color images, etc.). The measurements captured by the sensor 609 are used to generate three-dimensional depth images or depth maps of the object 601. For example, sensor 609 is a time of flight sensor. Alternatively, the sensor 609 is a camera with a structured-light sensor, or a structured-light scanner. A structured-light sensor is a scanner that includes a camera and a projector. In another alternative, time of flight sensors are used. Other types of sensors may also be provided.

The mobile device 602 is used to implement the system for determining the pose of a mobile device in a three-dimensional scene. Storage 612 and/or memory 610 is configured to store a plurality of depth data measurements indicative of a depth from the mobile device to the three-dimensional scene. Processor 604 receives the plurality of depth data measurements from the storage 612 and/or the memory 610. Processor 604 determines a pose of the mobile device with respect to the three-dimensional scene. The pose is determined based on fusing estimated poses for each of the plurality of depth data measurements using a dynamic model. The determined pose includes a location and viewing angle of the mobile device 602. The dynamic model a multi-window fusion model based on partitioning sensor measurements into a plurality of windows for each sensor measurement, a multi-shot fusion model based on sensor movement between sensor measurements, a multi-sensor fusion model based on known spatial relationships between different sensors, or a combination thereof. The determined pose is used to provide an output to a user, such as using a display 614 of the mobile device 602.

The mobile device 602 also includes one or more network interfaces 606 for communicating with other devices via a network. The mobile device 602 includes other input/output devices 608 that enable user interaction with the mobile device 602 (e.g., display, keyboard, mouse, speakers, buttons, etc.). Such input/output devices 608 may be used in conjunction with a set of mobile device programs as an annotation tool to annotate volumes received from the sensor 609. One skilled in the art will recognize that an implementation of an actual mobile device could contain other components as well, and that FIG. 6 is a high level representation of some of the components of such a mobile device for illustrative purposes.

Figure 7:
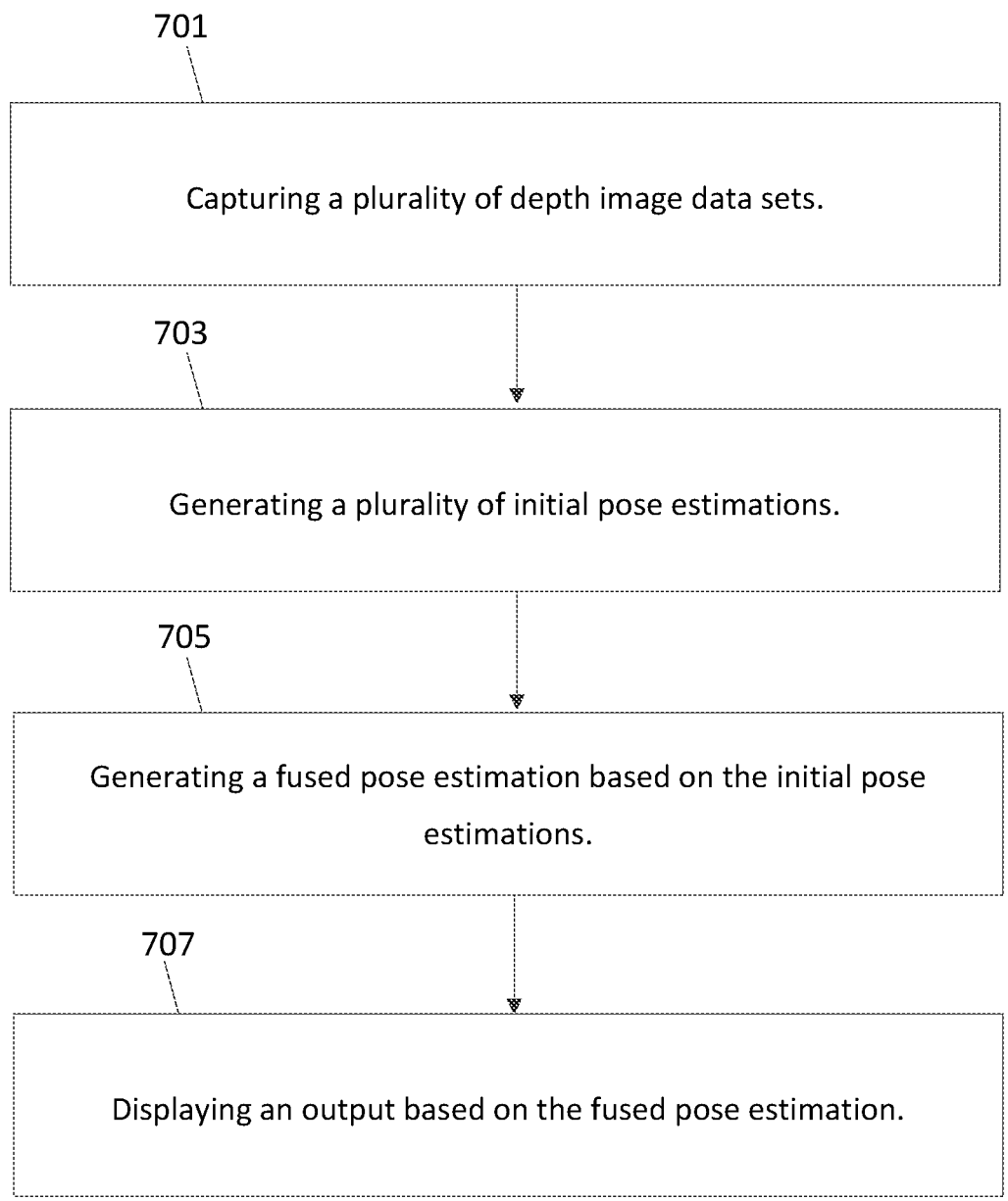
FIG. 7 illustrates a flowchart diagram of an embodiment of localizing a mobile device in a three-dimensional scene.

FIG. 7 illustrates a flowchart diagram of an embodiment of localizing a mobile device in a three-dimensional scene. The method is implemented by the system of FIG. 6 and/or a different system. Additional, different or fewer acts may be provided. For example, the act 707 may be omitted. The method is provided in the order shown. Other orders may be provided and/or acts may be repeated. For example, acts 701 and 703 may be repeated for capturing additional depth measurements and estimating additional poses.

At act 701, a plurality of depth image data sets of the three-dimensional scene are captured. The depth image data sets are captured by a sensor 609 of the mobile device 609. Additionally, the depth image data sets may be captured by a plurality of sensors of the mobile device 602.

At act 703, a plurality of initial pose estimations are generated for the mobile device with respect to the three-dimensional scene. The initial pose estimations are generated by a processor 604 of the mobile device 602. Each of the initial pose estimations are based on a different depth image data set captured by the sensor 609. In an embodiment, the initial pose estimations are generated in parallel operations by the processor 604 of the mobile device 602.

At act 705, a fused pose estimation is generated for the mobile device with respect to the three-dimensional scene. The fused pose estimation is generated by the processor 604 of the mobile device 602. The fused pose estimation is generated using a trained machine-learning model based on the initial pose estimations, such as a neural network. The trained machine-learning model implements multi-window fusion, multi-shot fusion, multi-sensor fusion, or a combination thereof.

At act 707, an output is displayed based on the fused pose estimation. The output is displayed by a display 614 of the mobile device 602. For example, the output may be an automated part identification output, such as a part number for an assembled product. Alternatively, the output may be an initialization or tracking for an augmented reality scenario. Any output may be provided using the fused pose estimation of the mobile device, such as for scene understanding based decision making.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method of estimating a pose of a mobile device in a three-dimensional scene, the method comprising:

receiving, by a processor of the mobile device, a plurality of depth data measurements, the depth data measurements indicative of a depth from the mobile device to the three-dimensional scene;

estimating, based on a first depth measurement of the plurality of depth data measurements, a first pose of the mobile device with respect to the three-dimensional scene;

estimating, based on a second depth measurement of the plurality of depth data measurements, a second pose of the mobile device with respect to the three-dimensional scene;

estimating, with a pose model based on the first pose and the second pose, a third pose of the mobile device with respect to the three-dimensional scene; and providing, based on the third pose, an output to a user.

2. The method of claim 1, wherein the plurality of depth data measurements comprise measurements of a same sensor, and wherein the pose model is a motion model based on movement of the same sensor between measurements.

3. The method of claim 2, wherein the motion model is a linear motion model based on sensor velocity measurements and corresponding time measurements.

4. The method of claim 2, wherein the motion model is a learned motion model, wherein a plurality of possible trajectories of the sensor are determined by the plurality of depth data measurements, the first pose and the second pose.

5. The method of claim 1, wherein the plurality of depth data measurements comprise measurements of different sensors, and wherein the pose model is a spatial model based on known spatial relationships between the different sensors.

6. The method of claim 1, wherein the plurality of depth data measurements comprise a plurality of measurements of each of a plurality of different sensors, and wherein the pose model includes a motion model based on movement of each sensor between measurements by the sensor and a spatial model based on known spatial relationships between the different sensors.

7. The method of claim 1, wherein the plurality of depth data measurements are partitioned from a single sensor measurement, and wherein the pose model comprises combining the first pose and the second pose into the third pose.

8. The method of claim 7, wherein the combining comprises a weighted average, mode finding or semantic mapping.

9. The method of claim 1, wherein the plurality of depth data measurements comprise measurements of a same sensor, and wherein a location of the mobile device for the second depth measurement is specified based on the first pose of the mobile device.

10. The method of claim 1, wherein the three-dimensional scene comprises a three-dimensional apparatus, and wherein the output to the user is a component of the three-dimensional apparatus.

11. The method of claim 1, wherein the output to the user comprises initialization or tracking in an augmented reality scenario.

12. A system for determining a pose of a mobile device in a three-dimensional scene, the system comprising:
a memory configured to store a plurality of depth data measurements, the depth data measurements indicative of a depth from the mobile device to the three-dimensional scene; and
a processor configured to:
receive the plurality of depth data measurements;
estimate, based on a first depth measurement of the plurality of depth data measurements, a first pose of the mobile device with respect to the three-dimensional scene;
estimate, based on a second depth measurement of the plurality of depth data measurements, the second depth measurement different from the first depth measurement of the plurality of depth data measurements, a second pose of the mobile device with respect to the three-dimensional scene;
estimate, with a pose model based on the first pose and the second pose, a third pose of the mobile device with respect to the three-dimensional scene; and
provide, based on the third pose, an output to a user.

13. The system of claim 12, wherein a dynamic model comprises one or more of:
a multi-window fusion model based on partitioning sensor measurements into a plurality of windows for each sensor measurement;
a multi-shot fusion model based on sensor movement between sensor measurements; and
a multi-sensor fusion model based on known spatial relationships between different sensors.

14. The system of claim 12, further comprising:
a sensor configured to capture the plurality of depth data measurements.

15. The system of claim 14, wherein the sensor is a 2.5D sensor or a depth sensor.

16. The system of claim 12, further comprising:
a display configured to provide the output to a user based on the estimated pose.

* * * * *